(12) United States Patent
Oliveira

(10) Patent No.: US 9,874,899 B2
(45) Date of Patent: Jan. 23, 2018

(54) DEVICES AND METHODS FOR DISPENSING HAND SANITIZER

(71) Applicant: Michael Oliveira, Riverview, FL (US)

(72) Inventor: Michael Oliveira, Riverview, FL (US)

(*) Notice: Subject to any disclaimer, the term of this patent is extended or adjusted under 35 U.S.C. 154(b) by 41 days.

(21) Appl. No.: 14/957,160

(22) Filed: Dec. 2, 2015

(65) Prior Publication Data

US 2016/0150920 A1 Jun. 2, 2016

Related U.S. Application Data

(60) Provisional application No. 62/086,452, filed on Dec. 2, 2014.

(51) Int. Cl.
| | |
|---|---|
| *A47K 5/12* | (2006.01) |
| *A47K 5/122* | (2006.01) |
| *B65D 83/00* | (2006.01) |
| *G06F 1/16* | (2006.01) |
| *B65D 1/32* | (2006.01) |

(52) U.S. Cl.
CPC ............. *G06F 1/16* (2013.01); *B65D 1/32* (2013.01); *A47K 5/1201* (2013.01); *A47K 5/122* (2013.01); *B65D 83/0055* (2013.01)

(58) Field of Classification Search
CPC ......... B65D 1/32; B65D 83/0055; G06F 1/16; A47K 5/122; A47K 5/1201
See application file for complete search history.

(56) References Cited

U.S. PATENT DOCUMENTS

| | | | | |
|---|---|---|---|---|
| 5,429,301 A | * | 7/1995 | Franks | B65D 83/384 222/145.1 |
| 5,678,730 A | * | 10/1997 | Fabek | A45F 5/00 2/160 |
| 5,924,601 A | * | 7/1999 | Chen | F41H 9/10 222/175 |
| 6,234,357 B1 | * | 5/2001 | Lewis | A45F 5/02 222/175 |
| 6,966,462 B1 | * | 11/2005 | Torrence | A41D 13/081 2/160 |
| 7,316,332 B2 | * | 1/2008 | Powers | A45D 34/00 222/1 |

(Continued)

FOREIGN PATENT DOCUMENTS

| | | |
|---|---|---|
| EP | 1679670 A1 | 7/2006 |
| EP | 2905571 A1 | 8/2015 |

(Continued)

OTHER PUBLICATIONS

Atomyzer—The Case That Sprays http://www.atomyzer.com/ last visited on Aug. 4, 2017.

*Primary Examiner* — Frederick C Nicolas
(74) *Attorney, Agent, or Firm* — Carter, DeLuca, Farrell & Schmidt, LLP

(57) ABSTRACT

A portable sanitizer dispenser for use with a cellular phone includes a hand sanitizer dispenser configured to releasably engage at least one surface of a cellular phone. The sanitizer dispenser includes a compressible cavity defined therein configured to retain a sanitizer therein. The sanitizer dispenser further includes a nozzle disposed on an outer surface thereof. The nozzle is in fluid communication with the compressible cavity such that when pressure is applied to the compressible cavity, sanitizer is expelled from the nozzle.

10 Claims, 7 Drawing Sheets

(56) References Cited

U.S. PATENT DOCUMENTS

| | | | | |
|---|---|---|---|---|
| 8,155,706 | B1 * | 4/2012 | Hurst | H04M 19/04 |
| | | | | 222/325 |
| 8,286,834 | B2 * | 10/2012 | Powers | A45D 34/00 |
| | | | | 222/175 |
| 8,844,766 | B2 * | 9/2014 | Zaima | A61L 2/26 |
| | | | | 222/162 |
| 8,976,031 | B2 | 3/2015 | Ophardt | |
| 9,050,620 | B2 | 6/2015 | Mireles | |
| 9,578,935 | B2 * | 2/2017 | Horgan | A45D 34/00 |
| 2004/0235430 | A1 | 11/2004 | Ma et al. | |
| 2006/0042419 | A1 | 3/2006 | Deng et al. | |
| 2007/0164050 | A1 | 7/2007 | Knight | |
| 2008/0035207 | A1 | 2/2008 | Lamers et al. | |
| 2009/0137288 | A1 | 5/2009 | Seo et al. | |
| 2011/0186656 | A1 | 8/2011 | Cho et al. | |
| 2013/0105518 | A1 | 5/2013 | McPherson et al. | |
| 2014/0204513 | A1 | 7/2014 | Del Padre et al. | |
| 2015/0374870 | A1 | 12/2015 | Hsu | |

FOREIGN PATENT DOCUMENTS

| | | |
|---|---|---|
| KR | 20010078935 A | 8/2001 |
| WO | 2006042419 A1 | 4/2006 |

* cited by examiner

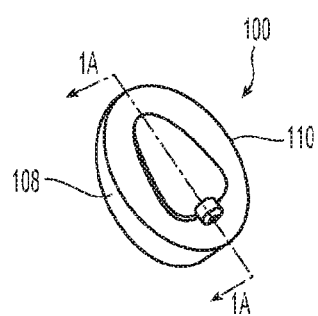
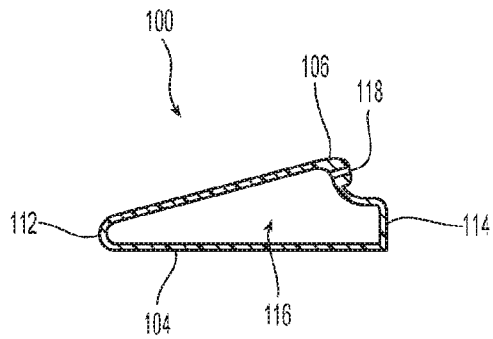
Fig. 1    Fig. 1A
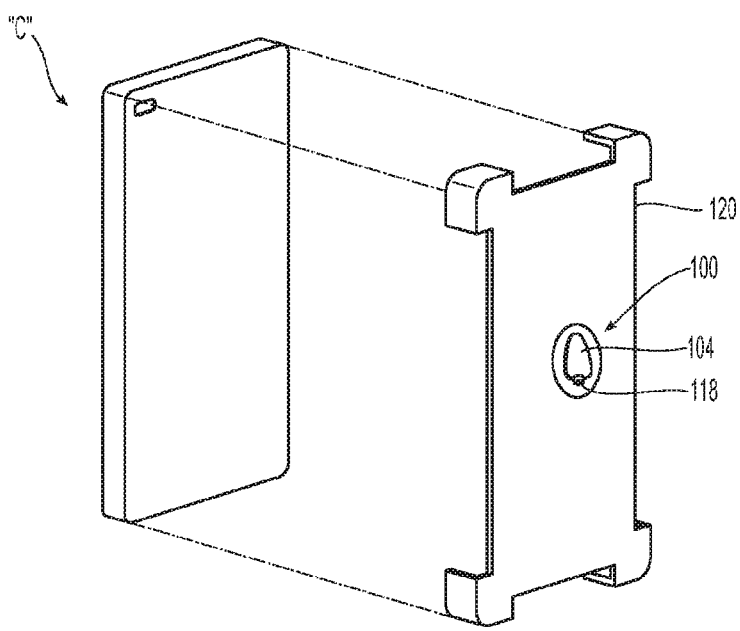
Fig. 2
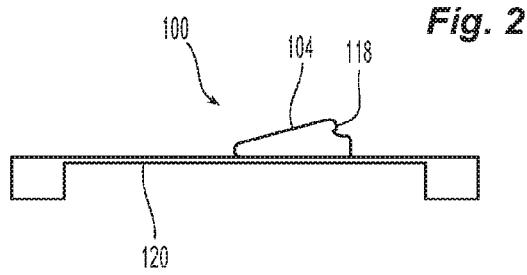
Fig. 3
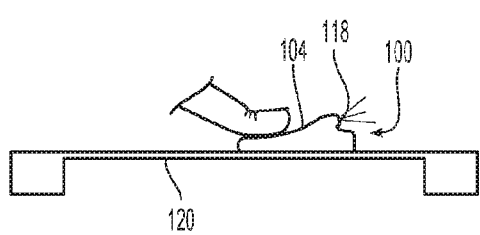
Fig. 4

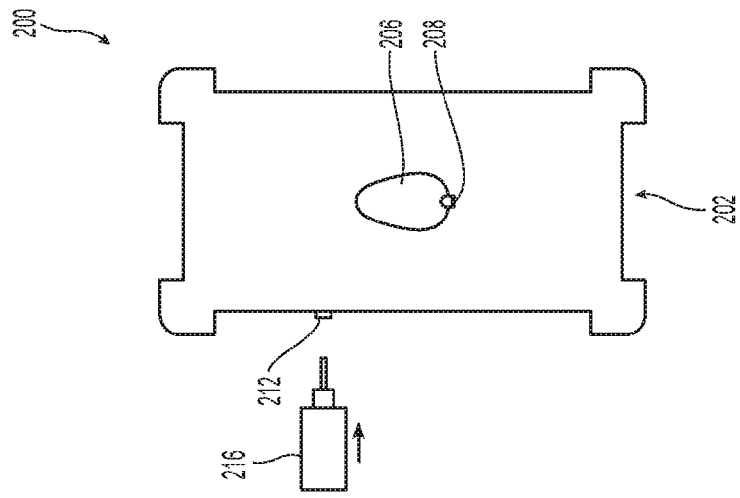
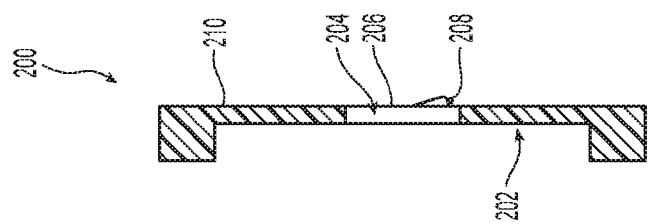
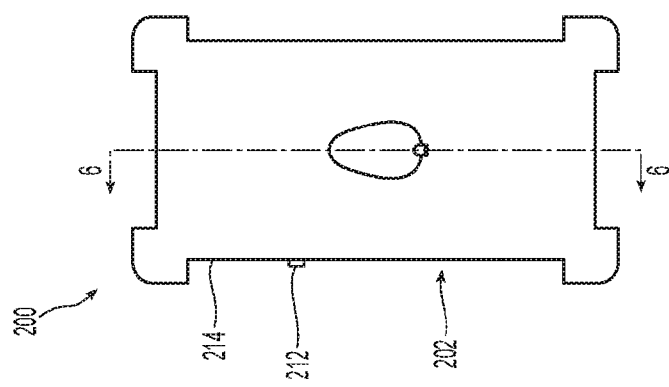

DEVICES AND METHODS FOR DISPENSING HAND SANITIZER

CROSS-REFERENCE TO RELATED APPLICATIONS

This application claims the benefit of, and priority to, U.S. Provisional Patent Application. No. 62/086,452, filed on Dec. 2, 2014, the entire contents of which are incorporated herein by reference.

BACKGROUND

Technical Field

The present disclosure relates to dispensers and, more particularly, to portable hand sanitizer dispensers.

Description of Related Art

Humans interact with hundreds if not thousands of objects every day. Manipulating or touching these objects transmits pathogens, such as viruses, bacteria, fungus, and the like, and in doing so, fosters the spread of sicknesses and disease. As such, the use of hand sanitizers, such as PURELL®, SHBAN™, Germ-X®, and similar alcohol based or alcohol free liquids or gels that effectively kill 99.9% of these pathogens has become more prevalent. However, hand sanitizers are typically dispensed through the use of pump bottles, touch free dispensers, and other large dispensers incapable of truly portable use. Therefore, one is unable to sanitize his/her hands frequently or after handling objects that may transmit pathogens unless a dispenser is nearby and handy, thereby promoting the spread of disease.

Therefore, a need exists for portable hand sanitizer dispensers that may be easily carried and deployed with minimal effort.

SUMMARY

A portable sanitizer dispenser for use with a cellular phone includes a sanitizer dispenser configured to releasably engage at least one surface of a cellular phone. The sanitizer dispenser includes a compressible cavity defined therein configured to retain a sanitizer therein and a nozzle disposed on an outer surface of the sanitizer dispenser. The nozzle is in fluid communication with the compressible cavity such that when pressure is applied to the compressible cavity, sanitizer is expelled from the nozzle.

In aspects, the portable sanitizer dispenser may further include a safety mechanism configured to inhibit sanitizer from being accidentally expelled from the nozzle.

In other aspects, a resilient pad may be disposed over the compressible cavity such that when the resilient pad is depressed, the sanitizer contained within the compressible cavity is discharged from the nozzle.

In aspects, the portable hand sanitizer dispenser may include a fill port disposed on the sanitizer dispenser. The fill port is in fluid communication with the compressible cavity.

In other aspects, the fill port may be a one way valve capable of mating with a fill bottle, wherein insertion of the fill bottle within the fill port re-fills the compressible cavity with hand sanitizer.

In certain aspects, the safety mechanism may include a twist action mechanism, wherein in a first, unactuated position, sanitizer is prohibited from being expelled from the nozzle, and in a second, actuated position, sanitizer is permitted to be expelled from the nozzle.

In aspects, the twist action mechanism may include a rotatable base disposed on the sanitizer dispenser. The rotatable base may include a lumen defined therethrough.

In certain aspects, when the twist-action mechanism is in the first, unactuated position, the lumen is misaligned with the compressible cavity, and when the twist-action mechanism is in the second, actuated position, the lumen may be aligned with the compressible cavity.

In other aspects, when the twist-action mechanism is in the first, unactuated position, the lumen may be misaligned with the nozzle, and when the twist-action mechanism is in the second, actuated position, the lumen may be aligned with the nozzle.

In aspects, the twist action mechanism may include a biasing member configured to bias the twist action mechanism to the first unactuated position.

Another portable hand sanitizer dispenser for use with a cellular phone includes a cellular phone case configured to engage at least one surface of a cellular phone. The cellular phone case includes a compressible cavity defined therein configured to retain a sanitizer therein. The cellular phone case also includes a fill port disposed on at least one surface of the cellular phone case. The fill port is in fluid communication with the compressible cavity. The cellular phone case further includes a safety mechanism configured to inhibit sanitizer from being accidentally expelled from the compressible cavity and a dispenser including a nozzle in fluid communication with the compressible cavity such that upon application of pressure to the compressible cavity, sanitizer is expelled from the nozzle.

In aspects, the fill port may include a one way valve configured to permit sanitizer to flow into the compressible cavity, but not out of the compressible In other aspects, the fill port may be configured to mate with a fill bottle, wherein insertion of the fill bottle within the fill port re-fills the compressible cavity with sanitizer.

In certain aspects, the compressible cavity may be configured to receive a disposable packet of sanitizer.

In aspects, the compressible cavity may include a door rotatably secured to the cellular phone case. The door is rotatable from a first position where the compressible cavity is open, to a second position, where the compressible cavity is closed.

In certain aspects, the door may be selectively removable from the cellular phone case.

In other aspects, the door may include at least one tab disposed on an end surface thereof. The at least one tab is configured to engage a corresponding at least one slot defined within the cellular phone case.

In aspects, the safety mechanism may include a twist-action mechanism, wherein in a first, unactuated position, sanitizer is prohibited from being expelled from the nozzle, and in a second, actuated position, sanitizer is permitted to be expelled from the nozzle.

The other aspects, the twist-action mechanism may include a rotatable base disposed on the sanitizer dispenser, the rotatable base including a lumen defined therethrough.

In aspects, when the twist-action mechanism is in the first, unactuated position, the lumen may be misaligned with the compressible cavity, and when the twist action mechanism is in the second, actuated position, the lumen may be aligned with the compressible cavity. The twist action mechanism may include a biasing member configured to bias the twist action mechanism to the first, unactuated position.

BRIEF DESCRIPTION OF THE DRAWINGS

Various aspects and features of the present disclosure are described hereinbelow with references to the drawings, wherein:

FIG. 1 is a perspective view of a portable hand sanitizer dispenser provided in accordance with the present disclosure;

FIG. 1A is a cross-sectional view of the portable hand sanitizer dispenser of FIG. 1, taken along line 1A-1A;

FIG. 2 is a perspective view of a portable hand sanitizer dispenser provided in accordance with the present disclosure configured for attachment to an electronic device;

FIG. 3 is a side view of the portable hand sanitizer dispenser of FIG. 2;

FIG. 4 is a side view of the portable hand sanitizer dispenser of FIG. 2, illustrated as being actuated by a user;

FIG. 5 is a top view of another embodiment of a portable hand sanitizer dispenser provided in accordance with the present disclosure, illustrated as being integrated into a portable electronic device case;

FIG. 6 is a cross-sectional view of the portable hand sanitizer dispenser of FIG. 5 taken along line 6-6;

FIG. 7 is a top view of the portable hand sanitizer dispenser of FIG. 5, illustrated as being for use with a fill bottle;

DETAILED DESCRIPTION

Figure 9A:
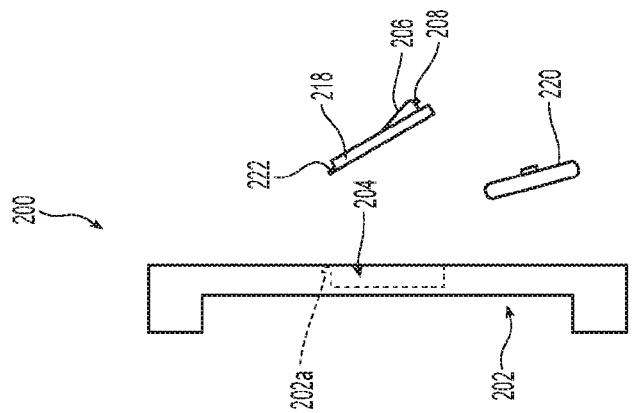
FIG. 9A is a side view of an alternate embodiment of the portable hand sanitizer dispenser of FIG. 8, shown with a removable door and sanitizer packet.

Devices and methods for portable hand sanitizer dispensing are provided in accordance with the present disclosure and described in detail below. The various portable hand sanitizer dispensers of the present disclosure, for example, each generally include an actuating member and nozzle in fluid communication with a hand sanitizer source. Detailed embodiments of such devices and methods of using the same are described below. However, these detailed embodiments are merely examples of the present disclosure, which may be embodied in various forms.

With reference to FIGS. 1 and 1A, a portable hand sanitizer dispenser provided in accordance with the present disclosure is illustrated and generally identified by reference numeral 100. Portable hand sanitizer dispenser 100 includes a substantially flat bottom surface 104 and an upper surface 106 defining substantially planar side surfaces 108 and 110. A pair of opposed first and second end surfaces 112, 114 extend between each of planar side surfaces 108, 110. A hollow interior 116 is defined within portable hand sanitizer dispenser 100 and is configured to contain a hand sanitizer therein. Although generally shown as having a generally egg shaped configuration, it is contemplated that portable hand sanitizer dispenser 100 may include any suitable shape, such as rectangular, circular, oval, square, or the like. Further, although shown as increasing in height in a direction from first end surface 112 towards second end surface 114, it is contemplated that upper surface 106 may increase in height in any direction, may be substantially parallel to bottom surface 104, or may include elevations or depressions therein.

Portable hand sanitizer dispenser 100 is constructed from a resilient material such that bottom surface 104 may conform to any surface to which it is placed upon. However, it is contemplated that portable hand sanitizer dispenser may be constructed from a rigid material, or a combination of rigid and resilient materials. Such materials may be polymeric (e.g., rubber, silicone, polyethylene), composites, organic material, metals, or the like. An adhesive is disposed on bottom surface 104 such that portable hand sanitizer dispenser 100 may be selectively adhered to any surface. As can be appreciated, other fastening methods may be employed that permit a user to adhere, and then easily remove, portable hand sanitizer dispenser 100 from a surface, such as magnetic, static cling, hook and loop, button-like, twist-on, or the like.

A nozzle 118 is disposed on upper surface 106 and is in fluid communication with hollow interior 116. In this manner, as a user depresses upper surface 106, the hand sanitizer contained within hollow interior 116 is discharged out of nozzle 118. Nozzle 118 may be any suitable nozzle known in the art and capable of discharging hand sanitizer. In embodiments, nozzle 118 may be an atomizing type, or may merely be a lumen (not shown) capable of transferring hand sanitizer from hollow interior 116 to a user's hand.

Although generally referred to as hand sanitizer, the hand sanitizer referenced herein may be any hand sanitizer known in the art, such as liquids, gels, or the like (e.g., PURELL®, SHBAN™, Germ-X®, etc.).

With reference to FIGS. 2-4, in use, a user may adhere portable hand sanitizer dispenser 100 to any suitable surface, such as a cellular phone "C", tablet, portable music device, handbag, electronic device case or the like. In one non-limiting embodiment, portable hand sanitizer dispenser 100 may be adhered to a cellular phone case 120. Once adhered to the cellular phone case 120, a user may then depress the upper surface 104 of portable hand sanitizer dispenser 100 to discharge the hand sanitizer contained within hollow interior 116 out of nozzle 118. This process may be repeated as many times as desired. Once the hand sanitizer contained within hollow interior 116 of portable hand sanitizer dispenser 100 has been extinguished, the user may remove portable hand sanitizer dispenser 100 from the cellular phone case and be discarded. As can be appreciated, portable hand sanitizer dispenser 100 may be constructed of recyclable materials.

Although generally described as being selectively removable from a surface, it is contemplated that portable hand sanitizer dispenser 100 may be fixedly secured to a surface, such as a cellular phone case, tablet case, portable music player case, or the like. In this manner, portable hand sanitizer dispenser 100 may be selectively attachable to any portable electronic device known in the art, such as an iPod®, iPad®, Kindle® devices, or other portable music players (i.e., MP3's, MiniDisc, or the like) or tablets.

Referring now to FIGS. 5-7, another embodiment of a portable hand sanitizer dispenser is provided in accordance with the present disclosure is illustrated and generally identified by reference numeral 200. Although generally shown as being integrated into a cellular phone case, it is contemplated that portable hand sanitizer dispenser 200 may integrated into any type of protective case, such as a tablet case, laptop case, portable music player case, or the like.

Portable hand sanitizer dispenser 200 includes a cellular phone case 202 capable of being selectively secured to a cellular phone. Case 202 includes a cavity or void 204 defined therein capable of retaining a hand sanitizer therein. A resilient pad 206 is disposed over cavity 204, such that a user may depress resilient pad 206 into cavity 204. A nozzle 208 is fixedly disposed on case 202 and is in fluid communication with cavity 204. In this manner, when a user depresses resilient pad 206, the hand sanitizer contained within cavity 206 is discharged from nozzle 208. Although generally shown as being disposed on a back surface 210 of the cellular phone case 202, it is contemplated that resilient pad and nozzle 208 may be placed at any suitable location on the cellular phone case 202. A fill port 212 is disposed on a side surface 214 of cellular phone case 202 and is in fluid communication with cavity 206. Fill port 212 may be any suitable fill port known in the art capable of receiving a fill bottle 216 or other similar device to recharge the cavity 206 with hand sanitizer. In embodiments, fill port 212 may be a one way valve to prevent hand sanitizer from backflowing out the fill port 212.

As can be appreciated, cellular phone case 202 is constructed of a suitable resilient or rigid material capable of being removably secured to a cellular phone and protecting it from shock, scratches, or other trauma. Resilient pad 206 may be constructed of any suitable material described above with respect to portable hand sanitizer dispenser 100. It is contemplated that portable hand sanitizer dispenser 200 may be sold pre-filled with hand sanitizer, although in embodiments, portable hand sanitizer dispenser 200 may be sold empty such that a user may fill portable hand sanitizer dispenser 200 with any desired hand sanitizer.

Continuing with FIGS. 5-7, in use, a user initially secures cellular phone case 202 to a cellular phone. At this point, the user may utilize portable hand sanitizer dispenser 200 in a substantially similar manner to that described above with respect to portable hand sanitizer dispenser 100, and thus, in the interest of brevity, only the differences therebetween will be described hereinbelow. Once the hand sanitizer contained within portable hand sanitizer dispenser 200 has been extinguished, a user may re-fill portable hand sanitizer dispenser 200 using a suitable fill bottle 216 containing a desired hand sanitizer. At this point, a fill point 216a of the fill bottle 216 may be inserted within fill port 212 of cellular phone case 202 to re-fill cavity 206 with hand sanitizer. The process of using portable hand sanitizer dispenser 200 may be repeated as many times as desired.

Figure 9:
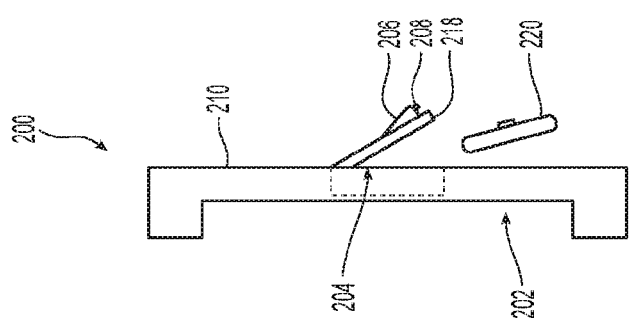
FIG. 9 is a side view of the portable hand sanitizer dispenser of FIG. 8, shown with an articulating door and a sanitizer packet.
Figure 8:
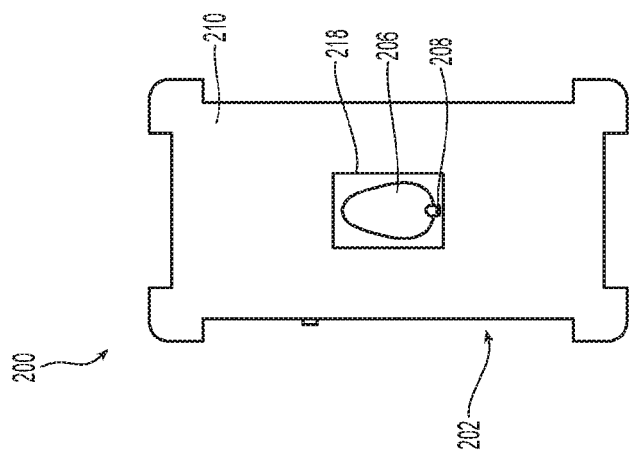
FIG. 8 is a top view of yet another embodiment of a portable hand sanitizer dispenser provided in accordance with the present disclosure, illustrated as being integrated into a portable electronic device case.

Turning now to FIGS. 8-9A, an alternate embodiment of portable hand sanitizer dispenser 200 is illustrated. In this embodiment, cellular phone case 202 includes a door or flap 218 rotatably secured to cellular phone case 202 and configured to permit access to cavity 204 when in a first, open position (FIG. 9), and prohibit access to cavity 204 when in a second, closed position (FIG. 8). In this manner, resilient pad 206 and nozzle 208 are disposed on door 218 such that nozzle 208 is in fluid communication with cavity 204 when door 218 is in a second, closed position.

Cavity 206 is configured to receive a hand sanitizer pouch 220. Hand sanitizer packet 220 may be any suitable hand sanitizer packet 220 known in the art (such as hand sanitizer refills or the like) capable of being inserted within, and retained within, cavity 204. It is contemplated that door 218 may include at least one needle or knife (not shown) disposed on an underside thereof capable of puncturing hand sanitizer packet 220 such that cavity 204 may be filled with hand sanitizer. In embodiments, a hollow needle (not shown) may be disposed on an underside of door 218 that is in fluid communication with nozzle 208. In this manner, as resilient pad 206 is depressed, hand sanitizer is expelled from hand sanitizer packet 220, through the needle, and out nozzle 208.

As can be appreciated, door 218 may include at least one tab 222 disposed on a side surface 218a thereof configured to be inserted within a corresponding slot 202a defined within cellular phone case 202. In this manner, tab 222 is advanced within slot 202a such that door 218 is selectively rotatable in relation to cellular phone case 202 from the first, open position, to the second, closed position. As can be appreciated, door 218 may be maintained in rotatable relation to cellular phone case 202 via a living hinge, hinge pin, or the like. Further, it is contemplated that door 218 may retained in a closed position via a snap fit configuration. In embodiments, a sealing means may be employed between door 218 and cellular phone case 202 such that hand sanitizer may not leak out of cavity 204 when door 218 is in a closed position. As can be appreciated, the sealing means may be a gasket, molded seal, or the like.

In embodiments, cellular phone case 202 may be entirely hollow to permit the entirety of cellular phone case 202 to define cavity 204. In this manner, cellular phone case 202 may contain the hand sanitizer (or additional hand sanitizer than would ordinarily be permitted if a smaller cavity 204 were utilized).

During use, as illustrated in FIGS. 8-9A, when the hand sanitizer contained within hand sanitizer packet 220 is extinguished, a user may initially rotate door 218 to a first, open position, or alternatively, remove door 218, such that cavity 204 is accessible. At this point, the used hand sanitizer packet 220 is removed from cavity 204. Next, a new hand sanitizer packet 220 is inserted within cavity 204. Finally, door 218 is rotated to a second, closed position, or alternatively, door 218 is replaced, such that cavity 204 is sealed off and a user may dispense hand sanitizer. The process of using portable hand sanitizer dispenser 200 may be repeated as many times as desired.

Figure 10C:
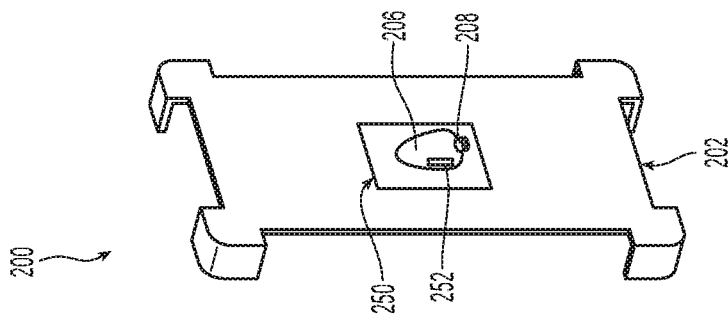
FIG. 10C is a perspective view of yet another safety mechanism provided in accordance with the present disclosure.
Figure 10B:
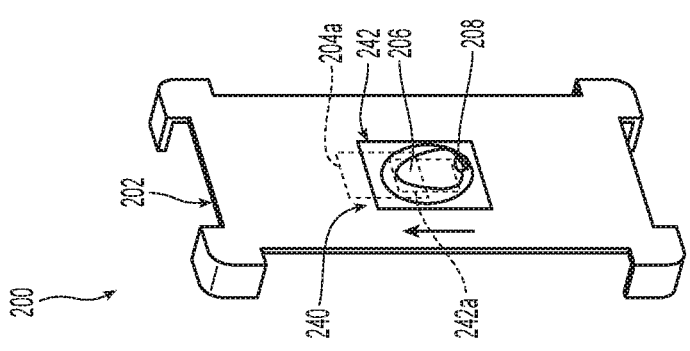
FIG. 10B is a perspective view of another safety mechanism provided in accordance with the present disclosure.
Figure 10A:
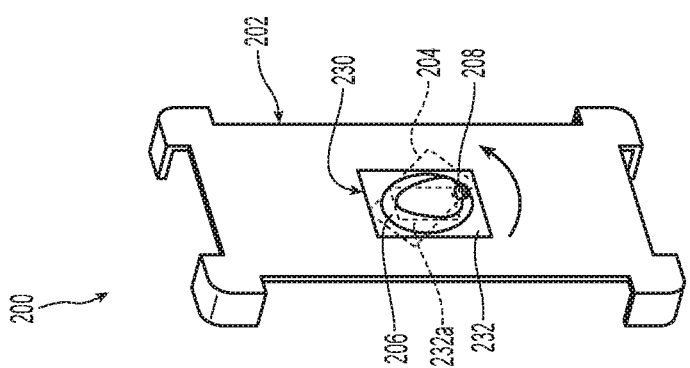
FIG. 10A is a perspective view of a safety mechanism provided in accordance with the present disclosure and configured to preclude accidental dispensing of hand sanitizer.

It is contemplated that portable hand sanitizer dispensers 100, 200 may include a safety device or other suitable means of inhibiting the accidental dispensing of hand sanitizer from nozzles 118 or 208. Various safety mechanisms and/or methods of inhibiting the accidental dispensing of hand sanitizer are illustrated in FIGS. 10A-10C. The various safety mechanisms and/or methods of inhibiting the accidental dispensing of hand sanitizer described hereinbelow will be similar in construction in terms of their application to either portable hand sanitizer dispenser 100 or 200. Therefore, in the interest of brevity, the various safety mechanisms and/or methods will be only be described in detail with respect to portable hand sanitizer dispenser 200.

With reference to FIG. 10A, a twist action mechanism 230 is employed. In this embodiment, a rotatable base 232 is disposed on a surface of cellular phone case 202. Rotatable base 232 is capable of being selectively rotated with respect to cellular phone case 202. In embodiments, a biasing member (not shown) may be employed to provide a biasing force in a direction opposing rotation of rotatable base 232. In this manner, the biasing member ensures that twist action mechanism 230 may not be armed without an external force acting thereupon (i.e., user applied force). Resilient pad 206 and nozzle 208 are disposed on rotatable base 232 and are in mechanical communication therewith (i.e., resilient pad 206 and nozzle 208 are rotatable in unison with rotatable base 232). Rotatable base 232 includes a lumen 232a defined therethrough configured to permit the depression of resilient pad 206. Cellular phone case 202 includes a throughbore 204a that is offset from the "home" position (i.e., the position in which the biasing member retains rotatable base 232), such that lumen 232a is only aligned with throughbore 204a when a user has rotated rotatable base 232 a sufficient distance. In this manner, resilient pad 206 may only be depressed when the lumen 232a and throughbore 204a are aligned. In any other configuration, resilient pad 206 may not be depressed, as resilient pad 206 will contact a surface of cellular phone case 202, thereby inhibiting the dispensing of hand sanitizer from nozzle 208.

Turning now to FIG. 10B, another embodiment of a safety mechanism for use with portable hand sanitizer dispensers 100, 200 is illustrated and generally identified by reference numeral 240. Safety mechanism 240 is substantially similar to twist mechanism 230 described hereinabove, except that safety mechanism 240 requires a user to linearly advance or retreat a slidable base 242 in order to depress resilient pad 206. In this manner, throughbore 204a is offset in a forward or backward position relative to the "home" position. In order to dispense hand sanitizer, a user must first advance slidable base 242, or pull back, slidable base 242 in order to align lumen 242a with throughbore 204a. In this manner, a biasing member (not shown) may bias slidable base 242 to the "home" position where throughbore 204a and lumen 242a are not in alignment, thereby inhibiting the depression of resilient pad 206 and the accidental dispensing of hand sanitizer.

Yet another embodiment of a safety mechanism for use with portable hand sanitizer dispensers 100, 200 is illustrated in FIG. 10C and is generally identified by reference numeral 250. Safety mechanism 250 includes a slidable latch 252 disposed on a side surface of resilient pad 206. Slidable latch 252 is configured to be advanced from a first position, where resilient pad 206 is inhibited from being depressed, to a second position, where resilient pad 206 is permitted to be depressed. As can be appreciated, slidable latch 252 may include a biasing member (not shown) capable of biasing slidable latch 252 to the first position. In this manner, a user must advance slidable latch 252 from the first position to the second position, and while holding slidable latch 252 in the second position, depress resilient pad 206 to dispense hand sanitizer from nozzle 208. In one non-limiting embodiment, slidable latch 252 is in mechanical communication with a tab or flap (not shown), although any suitable means of inhibiting depression of resilient pad 206 may be employed.

As can be appreciated, each of the above described safety mechanisms may preclude the dispensing of hand sanitizer by other means than preventing the depression of resilient pad 206. For example, various known two-stage activation methods may be utilized wherein a user must perform two mechanical (and/or electrical) functions to dispense the sanitizer. In embodiments, each of the safety mechanisms may cut off the flow of hand sanitizer through nozzle 206, or may cut off supply of hand sanitizer from cavity 204 or hand sanitizer packet 220.

Further, it is contemplated that each of the above described safety mechanisms may be disposed on cellular phone case 202 and be separate and distinct from resilient pad 206. In this manner, each of twist action mechanism 230 and safety mechanisms 240 and 250 may be disposed at a location remote from resilient pad 206.

With reference to FIGS. 11-18A, another embodiment of a portable hand sanitizer dispenser provided in accordance with the present disclosure is illustrated as being in the form of a bracelet and generally identified by reference numeral 300. Portable hand sanitizer dispenser 300 includes similar construction to that of portable hand sanitizer dispenser 200, except that portable hand sanitizer dispenser 300 is in the form of a bracelet 302. In this manner, bracelet 302 may be any bracelet known in the art. Although generally shown as having a circular cross section, it is contemplated that bracelet 302 may include any suitable cross section, such as rectangular, octagonal, hexagonal, or the like.

Bracelet 302 is constructed of an elastic material (i.e., rubber, silicone, etc.) capable of being manipulated and/or stretched such that it may be advanced over a user's hand and placed on the user's wrist. In embodiments, bracelet 302 may be constructed of a rigid material, such as plastics, metals, composites, organic materials, etc. Further, although shown as being formed monolithically (i.e., from one continuous piece of material), it is contemplated that bracelet 302 may be formed from two or more segments hingedly connected at a first end and capable of movement relative to each other. In embodiments, bracelet 302 may be solid, or contain a hollow interior.

Figure 13:
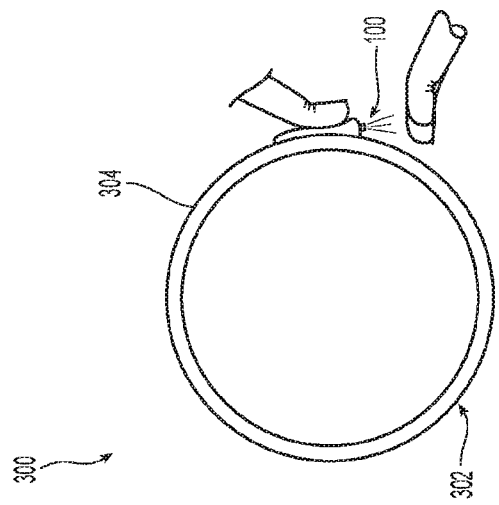
FIG. 13 is a side view of the portable hand sanitizer dispenser of FIG. 11, illustrated as being actuated by a user.
Figure 12:
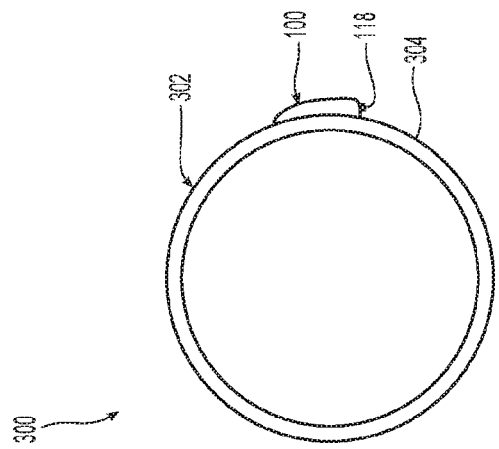
FIG. 12 is a side view of the portable hand sanitizer dispenser of FIG. 11.
Figure 11:
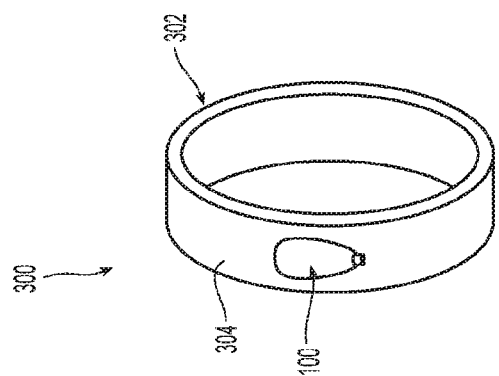
FIG. 11 is a perspective view of still another embodiment of a portable hand sanitizer dispenser provided in accordance with the present disclosure, illustrated as being disposed on a bracelet.

As best illustrated in FIGS. 11-13, portable hand sanitizer dispenser 100 is disposed on an outer surface 304 of bracelet 302 similarly as described hereinabove. In embodiments, portable hand sanitizer dispenser 100 may be selectively secured to outer surface 304, although it is contemplated that portable hand sanitizer dispenser 100 may be fixedly secured to outer surface 304. As can be appreciated, portable hand sanitizer dispenser 100 may be disposed on a side surface (not shown) of bracelet 302.

Portable hand sanitizer dispenser 300 is used similarly to portable hand sanitizer dispenser 100 as described hereinabove, and thus, in the interest in brevity, a detailed description of the use of portable hand sanitizer dispenser 300 will not be described hereinbelow.

Figure 16:
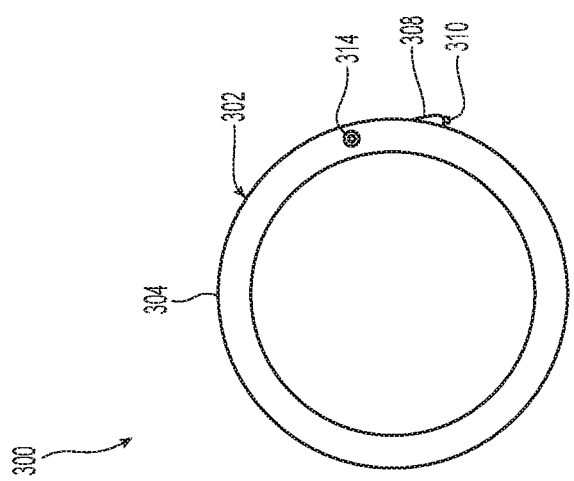
FIG. 16 is a side view of the portable hand sanitizer dispenser of FIG. 14, shown with a fill port.
Figure 15:
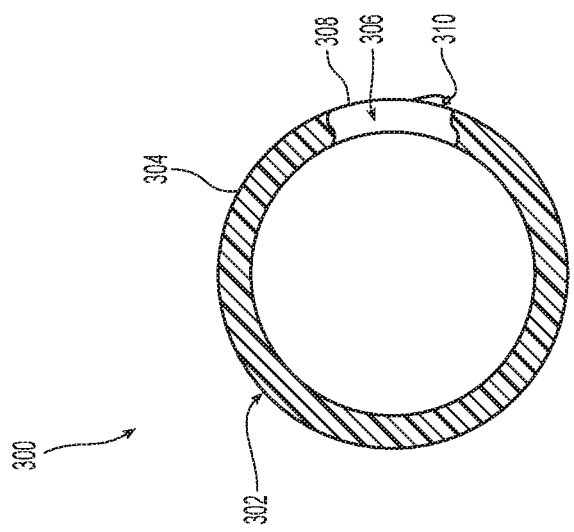
FIG. 15 is a cross-sectional view of the portable hand sanitizer dispenser of FIG. 14, taken along line 14-14.
Figure 14:
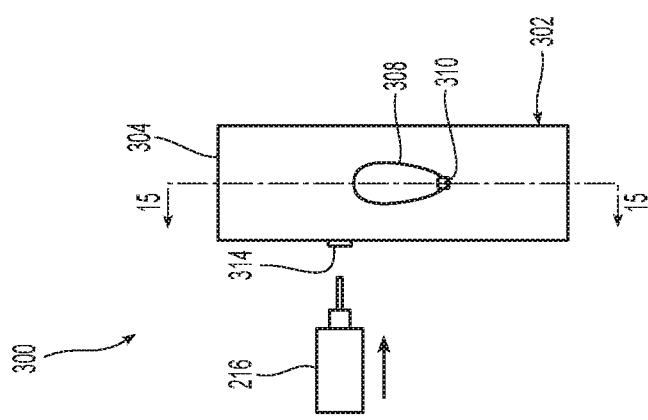
FIG. 14 is another embodiment of a portable hand sanitizer dispenser provided in accordance with the present disclosure, illustrated as being integrated within a bracelet.

With reference to FIGS. 14-16, in an alternative embodiment, bracelet 302 may be constructed in a similar fashion to portable hand sanitizer dispenser 200 as described in detail hereinabove, thus, in the interest of brevity, only the differences therebetween will be described in detail hereinbelow. The cavity or void 306 is defined within bracelet 302 and the resilient pad 308 and nozzle 310 are disposed on outer surface 304 of bracelet 302, although it is contemplated that the resilient pad 308 and nozzle 310 may be disposed on a side surface of bracelet 302. Fill port 314 is disposed on a side surface 316 of bracelet 302 and is utilized in a similar fashion to that described hereinabove. In embodiments, fill port 314 may be disposed on outer surface 312.

The use of portable hand sanitizer dispenser 300 including an hand sanitizer integrated within bracelet 302 is substantially similar to the use of portable hand sanitizer dispenser 200 including a hand sanitizer dispenser integrated within a cellular phone case, and thus, in the interest of brevity, a detailed description of portable hand sanitizer dispenser 300's use will not be described hereinbelow.

Figure 18A:
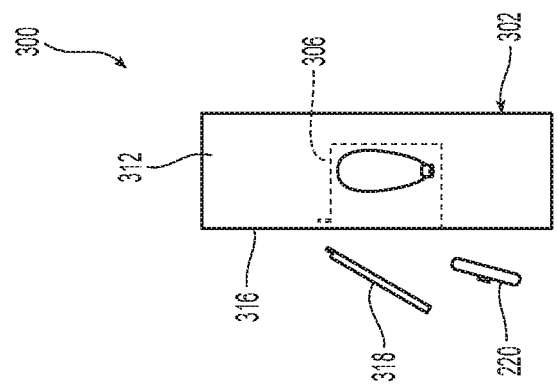
FIG. 18A is a front view of an alternate embodiment of the portable hand sanitizer dispenser of FIG. 17, illustrated as having a removable door and sanitizer packet.
Figure 18:
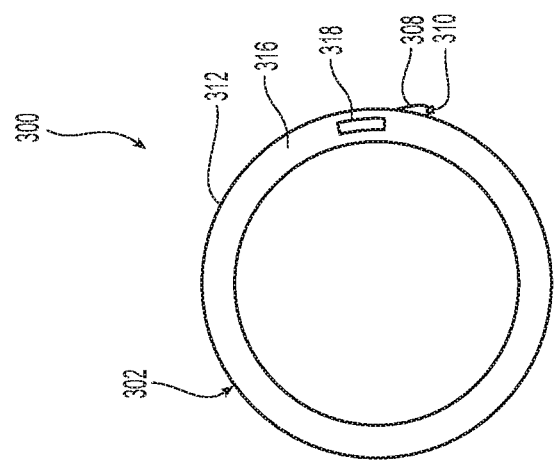
FIG. 18 is a side view of the portable hand sanitizer dispenser of FIG. 17.
Figure 17:
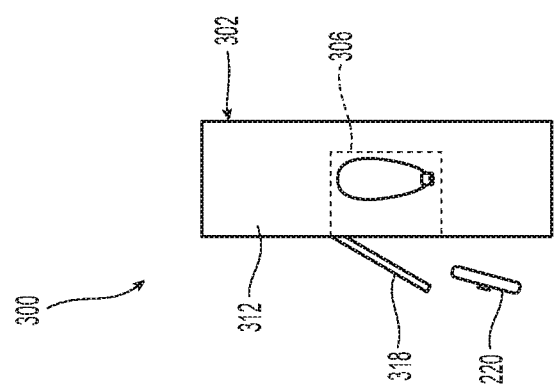
FIG. 17 is a front view of yet another embodiment of a portable hand sanitizer dispenser provided in accordance with the present disclosure, illustrated as having an articulating door and sanitizer packet.

FIGS. 17-18A illustrated another embodiment of portable hand sanitizer dispenser 300 is illustrated. This embodiment is substantially similar to portable hand sanitizer dispenser 200 including a door 218 as described in detail hereinabove. Thus, in the interest of brevity, only the difference therebetween will be described in detail hereinbelow.

Bracelet 302 includes a door 318 rotatably secured or removably secured to side surface 316, and is constructed and utilized in a substantially similar fashion to that described above with respect to door 218. In this manner, a hand sanitizer packet 220 may be inserted into cavity 306 when door 318 is in a first, open position, and contained within cavity 306 when door 318 is in a second, closed position. Door 318 does not include a resilient pad 308 or nozzle 310 disposed thereon. Rather, resilient pad 308 and nozzle 310 are disposed on outer surface 312 of bracelet 302. In this manner, door 318 may be constructed of a resilient or rigid material.

The use of portable hand sanitizer dispenser 300 including a door 318 is substantially similar to the use of portable hand sanitizer dispenser 200 including a door 218, and thus, in the interest of brevity, a detailed description of the use thereof will not be described in detail hereinbelow.

It is contemplated that portable hand sanitizer dispenser 300 may be constructed such that the entirety thereof is hollow. In this manner, the hollow interior of portable hand sanitizer dispenser 300 may define cavity 306, thereby enabling hand sanitizer dispenser 300 to contain the hand sanitizer (or additional hand sanitizer than would ordinarily be permitted if a smaller cavity 306 were utilized).

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A portable sanitizer dispenser for use with a cellular phone, comprising:
   a cellular phone case configured to engage at least one surface of a cellular phone, the cellular phone case including:
   a compressible cavity defined therein, the compressible cavity configured to retain a sanitizer therein;
   a fill port disposed on at least one surface of the cellular phone case, the fill port being in fluid communication with the compressible cavity;
   a safety mechanism configured to inhibit sanitizer from being accidentally expelled from the compressible cavity; and
   a dispenser including a nozzle in fluid communication with the compressible cavity such that upon application of pressure to the compressible cavity, sanitizer is expelled from the nozzle.

2. The portable sanitizer dispenser of claim 1, wherein the fill port includes a one way valve configured to permit sanitizer to flow into the compressible cavity, but not out of the compressible cavity.

3. The portable sanitizer dispenser of claim 2, wherein the fill port is configured to mate with a fill bottle, wherein insertion of the fill bottle within the fill port re-fills the compressible cavity with sanitizer.

4. The portable sanitizer dispenser of claim 1, wherein the compressible cavity is configured to receive a disposable packet of sanitizer.

5. The portable sanitizer dispenser of claim 4, wherein the compressible cavity includes a door rotatably secured to the cellular phone case, the door being rotatable from a first position where the compressible cavity is open, to a second position, where the compressible cavity is closed.

6. The portable sanitizer dispenser of claim 5, wherein the door is selectively removable from the cellular phone case.

7. The portable sanitizer dispenser of claim 6, wherein the door includes at least one tab disposed on an end surface thereof, the at least one tab configured to engage a corresponding at least one slot defied within the cellular phone case.

8. The portable sanitizer dispenser of claim 1, wherein the safety mechanism includes a twist-action mechanism, wherein in a first, unactuated position, sanitizer is prohibited from being expelled from the nozzle, and in a second, actuated position, sanitizer is permitted to be expelled from the nozzle.

9. The portable sanitizer dispenser of claim 8, wherein the twist-action mechanism includes a rotatable base disposed on the sanitizer dispenser, the rotatable base including a lumen defined therethough.

10. The portable dispenser of claim 9, wherein when the twist-action mechanism is in the first, unactuated position, the lumen is misaligned with the compressible cavity, and when the twist-action mechanism is in the second, actuated position, the lumen is aligned with the compressible cavity, wherein the twist-action mechanism includes a biasing member configured to bias the twist-action mechanism to the first, unactuated position.

* * * * *